Dec. 24, 1940.  L. T. SACHTLEBEN  2,225,714
SOUND RECORDING APPARATUS
Filed June 29, 1939

Inventor
Lawrence T. Sachtleben
By
Attorney

Patented Dec. 24, 1940

2,225,714

UNITED STATES PATENT OFFICE 2,225,714

SOUND RECORDING APPARATUS

Lawrence T. Sachtleben, Camden, N. J., assignor to Radio Corporation of America, a corporation of Delaware Application June 29, 1939, Serial No. 281,951

8 Claims. (Cl. 179—100.3)

This invention relates to sound recording apparatus and more particularly to apparatus for photographically recording sound upon film. The invention involves improvements on the apparatus described and claimed in the application of Edward W. Kellogg, Serial No. 280,960, filed June 24, 1939, and of Glenn L. Dimmick, Serial No. 281,819, filed June 29, 1939.

Both of the aforesaid applications relate to the use of a high pressure mercury vapor lamp for sound recording. As pointed out by the aforesaid Kellogg application, it requires a considerable time, something of the order of twenty minutes, from the time such a lamp is turned on until it reaches equilibrium. If the lamp current is then changed to bring the light to a desired brightness, it again requires a considerable time for the lamp to reach equilibrium. It is proposed by Kellogg to maintain the lamp at a constant current level sufficiently high to produce more light than is necessary and to optically reduce the quantity of light striking the film. The aforesaid Dimmick application discloses the use of a pair of shutters adjacent the mirror of the recording galvanometer for effecting the control of the light and the present invention pertains to a specific mechanism for controlling the shutters adjacent the galvanometer mirror.

According to the present invention the adjustment of the shutters is accomplished by a mechanism which is made coaxial with a pivot screw of the galvanometer and adjustable independently thereof. The adjusted mechanism is so constructed that it can be readily locked in position and the angular position of the galvanometer may be changed as desired without affecting the adjustment of the shutters.

One object of the invention is to provide an improved mechanism for controlling the light intensity in sound recording optical systems.

Another object of the invention is to provide a mechanism for controlling a pair of shutters adjacent a galvanometer mirror independently of the position of the galvanometer.

Another object of the invention is to provide mechanism for controlling the said shutters which is coaxial with a pivot pin of the galvanometer.

Figure 1:
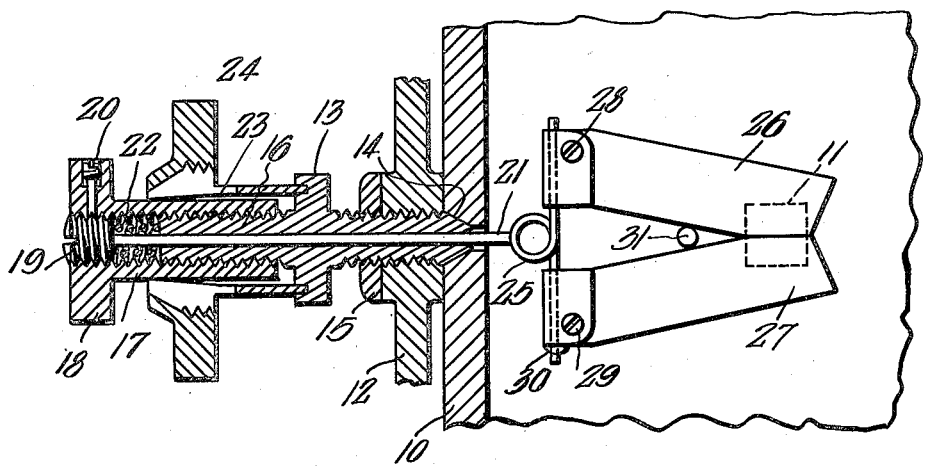
Figure 2:
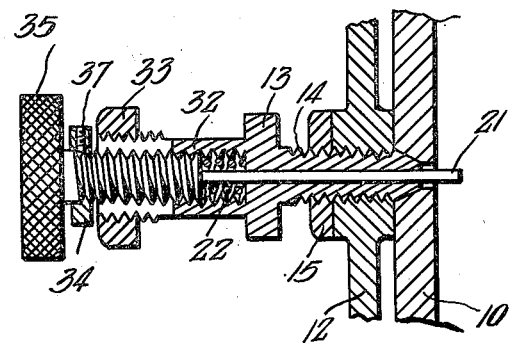

Other and incidental objects of the invention will be apparent to those skilled in the art from a reading of the following specification and an inspection of the accompanying drawing, in which Figure 1 is a longitudinal section of my improved mechanism showing the shutters in elevation, and Figure 2 is a longitudinal section of a modified form of the invention.

Referring first to the form of the invention shown in Fig. 1, the galvanometer casing which is greatly enlarged is indicated at 10 while the mirror of the galvanometer is indicated at 11. This galvanometer mirror is approximately one-tenth of an inch high and one-eighth of an inch long and the remaining parts of the apparatus are in substantially the relative size shown in the drawing. The galvanometer is supported for movement about an axis substantially coincident with the axis of rotation of the galvanometer mirror on a pivot screw 14. A corresponding but solid pivot screw is used at the other end of the axis of rotation for supporting the galvanometer. This pivot screw passes through the supporting yoke 12 into which it is threaded and is adjusted in position by means of the head 13. When the frictional engagement of the pivot screw with the galvanometer is properly adjusted, the pivot screw is locked in position by the lock nut 15.

The screw 14 is provided with an extension 16 beyond the head 13 and this extension is threaded externally to receive the internally threaded sleeve 17. The sleeve 17 carries a knurled head 18 by which it may be adjusted. It will be noted that the sleeve 17 at its innermost position may abut the head 13 preventing its being moved inwardly so far as to damage the shutter blades.

Within the head 18 there is placed a screw 19 which may be clamped in position by an appropriate set screw 20. A push rod 21 is rigidly secured to the screw 19 and may be adjusted thereby. It will be apparent that when the push rod 21 is placed in adjusted position by means of the screw 19 and secured by the set screw 20, any movement of the knurled head 18 will cause a corresponding movement of the sleeve 17 and will cause the push rod 21 to be moved longitudinally to the same extent that the sleeve 17 moves along the threaded portion 16. A spring 22 is provided between the screw 19 and the threaded portion 16 for taking up any lost motion. The head 13 has secured to it a sleeve 23 which is threaded on the outside and slitted so as to operate as a chuck and this sleeve 23 may be pressed against the threaded sleeve 17 by tightening the nut 24 which forces the ends of the sleeve 23 firmly into contact with the sleeve 17.

The end of the push rod 21 abuts the loop in the spring 25 which is connected to the shutters 26 and 27 which are pivoted, respectively, at 28 and 29. This spring 25 is preferably soldered or otherwise fixed to the shutter 27, as indicated at 30, and slides freely through a hole in the shutter 26. It will be apparent from the foregoing that when the knurled head 18 is turned clockwise the push rod 21 forces the spring 25 inwardly and causes the shutters 26 and 27 to separate unmasking the mirror 11. The degree to which the shutters 26 and 27 may be opened is determined by adjustment of the screw 19 so that at maximum opening of the shutters the threaded sleeve 17 abuts the head 13. A stop 31 may be provided if desired to prevent the edges of the shutters 26 and 27 from coming in contact and thereby becoming damaged.

In the alternative form of the invention shown in Fig. 2 the pivot screw 14 is not provided with an exterior threaded extension but is provided with an internally threaded sleeve 32 in which the screw 34 moves. This screw 34 carries the push rod 21 which it operates in the same manner as the push rod is operated by the threaded sleeve 17. If it is desired to provide a stop for the inward movement of the push rod 21 this may be accomplished by placing a pair of thin nuts or a single nut secured by a set screw, as indicated at 37. The sleeve 32 is split like the sleeve 23 in Fig. 1 and it is provided with a nut 33 fitting onto a tapered thread or carrying a tapered thread internally, or both, so that the tightening of the nut 33 will clamp the screw 34 in place. In this figure the knurled head 35 serves the same purpose as the knurled head 18 in Fig. 1.

I claim as my invention:

1. A sound recording galvanometer including a pair of shutters in front of the galvanometer mirror, pivot means in alignment with the axis of vibration of said mirror for supporting said galvanometer, and means concentric with said pivot means for adjusting said shutters whereby the adjustment of said shutters is independent of the position of the galvanometer on the said pivot.

2. Galvanometer adjusting means including a pivot screw supporting the galvanometer, longitudinally slidable means passing coaxially through said pivot screw, and means threaded to said pivot screw for adjusting said slidable means.

3. Galvanometer adjusting means including a pivot screw supporting the galvanometer, longitudinally slidable means passing coaxially through said pivot screw, means threaded to said pivot screw for adjusting said slidable means, and means for locking said threaded means to said pivot screw.

4. Galvanometer adjusting means including a pivot screw supporting the galvanometer, longitudinally slidable means passing coaxially through said pivot screw, means threaded to said pivot screw for adjusting said slidable means, and means for locking said threaded means to said pivot screw, said latter means comprising a chuck and a clamping nut.

5. In combination with a galvanometer having a mirror, a pair of shutters pivoted to swing over the said mirror from opposite sides, a spring connected to said shutters, and means pressing against said spring between the said shutters for actuating the said shutters.

6. In combination with a galvanometer having a mirror, a pair of shutters pivoted to swing over the said mirror from opposite sides, a spring secured to one of said shutters and slidably connected with the other of said shutters, and means pressing against said spring for actuating the said shutters.

7. In combination with a galvanometer having a mirror, a pair of shutters pivoted adjacent their outer edges to swing over the said mirror from opposite sides, a spring secured to one of said shutters and slidably connected with the other of said shutters, said spring having a bent portion between said shutters for providing additional resiliency, and means pressing against said bent portion between the said shutters for actuating the said shutters.

8. In combination with a galvanometer having a mirror, a pair of shutters pivoted adjacent their outer edges to swing over the said mirror from opposite sides, a spring secured to one of said shutters and slidably connected with the other of said shutters, said spring having a bent portion between said shutters for providing additional resiliency, pivot means in alignment with the axis of vibration of said mirror for supporting said galvanometer, and longitudinally adjustable means coaxial with said pivot means and abutting said bent portion for actuating said shutters.

LAWRENCE T. SACHTLEBEN.